(12) United States Patent
Hu et al.

(10) Patent No.: US 12,554,186 B2
(45) Date of Patent: Feb. 17, 2026

(54) PROJECTION DEVICE

(71) Applicant: Formovie(Chongqing)Innovative Technology Co., Ltd., Chongqing (CN)

(72) Inventors: Quanyou Hu, Chongqing (CN); Chanhao Chen, Chongqing (CN); Hao Jiang, Chongqing (CN); Yingduo Bi, Chongqing (CN)

(73) Assignee: Formovie(Chongqing)Innovative Technology Co., Ltd., Chongqing (CN)

( * ) Notice: Subject to any disclaimer, the term of this patent is extended or adjusted under 35 U.S.C. 154(b) by 364 days.

(21) Appl. No.: 18/235,952

(22) Filed: Aug. 21, 2023

(65) Prior Publication Data
US 2024/0073377 A1 Feb. 29, 2024

(30) Foreign Application Priority Data
Aug. 24, 2022 (CN) .......................... 202211018898.6

(51) Int. Cl.
*G03B 21/16* (2006.01)
*G03B 21/14* (2006.01)
*H04N 9/31* (2006.01)

(52) U.S. Cl.
CPC ........... *G03B 21/16* (2013.01); *G03B 21/145* (2013.01); *H04N 9/3144* (2013.01)

(58) Field of Classification Search
CPC ..... G03B 21/16; G03B 21/145; H04N 9/3144
See application file for complete search history.

(56) References Cited

U.S. PATENT DOCUMENTS

| | | | | |
|---|---|---|---|---|
| 6,185,052 | B1* | 2/2001 | Fujimori | H04N 9/3144 353/122 |
| 6,572,231 | B1* | 6/2003 | Watanabe | H04N 9/3141 348/E5.143 |
| 2008/0055558 | A1* | 3/2008 | Tang | G03B 21/006 353/33 |
| 2008/0055561 | A1* | 3/2008 | Lv | G03B 21/16 353/57 |
| 2008/0055562 | A1* | 3/2008 | Zhang | G03B 21/16 353/97 |

(Continued)

FOREIGN PATENT DOCUMENTS

| | | | |
|---|---|---|---|
| CN | 108761976 A | * 11/2018 | ............. G03B 21/16 |
| CN | 208188558 U | * 12/2018 | |

(Continued)

*Primary Examiner* — Bao-Luan Q Le
(74) *Attorney, Agent, or Firm* — Ballard Spahr LLP

(57) ABSTRACT

A projection device includes a housing and a light engine, a circuit board, and a fan that are arranged in the housing. The bottom wall of the housing is provided with an air inlet hole facing the light engine and an air outlet hole. A first gap is formed between a bottom side of the light engine and the bottom wall of the housing, and in communication with the air inlet hole. The circuit board is arranged on a top side of the light engine. A second gap is formed between the circuit board and the light engine, and in communication with the air inlet hole. The fan is configured to drive cooling airflow entering the housing from the air inlet hole to respectively flow through the first gap and the second gap and then flow towards the first radiator, and to be discharged from the air outlet hole.

14 Claims, 6 Drawing Sheets

(56) References Cited

U.S. PATENT DOCUMENTS

| | | | | |
|---|---|---|---|---|
| 2008/0055570 | A1* | 3/2008 | Kong | G03B 21/20 |
| | | | | 353/100 |
| 2008/0252859 | A1* | 10/2008 | Nagahata | G03B 21/16 |
| | | | | 353/61 |
| 2009/0051829 | A1* | 2/2009 | Nagahata | G03B 21/145 |
| | | | | 348/789 |

FOREIGN PATENT DOCUMENTS

| | | | | | |
|---|---|---|---|---|---|
| CN | 208188560 | U | * | 12/2018 | G03B 21/145 |
| CN | 114137786 | A | * | 3/2022 | G03B 21/16 |
| CN | 114815474 | A | * | 7/2022 | G03B 21/16 |
| CN | 114879435 | A | * | 8/2022 | G03B 21/16 |
| CN | 114967304 | A | * | 8/2022 | G03B 21/16 |

* cited by examiner

PROJECTION DEVICE

CROSS REFERENCE TO RELATED APPLICATION

The present application claims priority to Chinese Patent Application No. 2022110188986, filed on Aug. 24, 2022, the content of which is incorporated herein by reference in its entirety.

TECHNICAL FIELD

The present disclosure relates to the field of projection device technologies, and in particular, to a projection device.

BACKGROUND

A projection device is a device that can project video, images, text, and the like onto a screen for displaying, and is widely used in places such as homes, offices, schools, and cinemas.

In an existing projection device, brightness of a light engine is often increased so as to form a clear projection picture in a strong-light environment. However, after the brightness of the light engine is increased, the light engine may generate a lot of heat, which may cause rapid decay of optical performance of optical devices in the light engine, thereby affecting projection brightness.

SUMMARY

According to various embodiments of the present disclosure, a projection device is provided.

A projection device includes a housing and a light engine, a circuit board, and a fan that are arranged in the housing. A bottom wall of the housing is provided with an air inlet hole and an air outlet hole. The light engine and the air inlet hole face each other. A first gap is formed between a bottom side of the light engine and the bottom wall of the housing. The first gap is in communication with the air inlet hole. A light source is connected to one side of the light engine. A first radiator is arranged on a side of the light source. The first radiator is connected to the light source in a thermal conductive manner. The circuit board is arranged on a top side of the light engine. A second gap is formed between the circuit board and the light engine, and the second gap is in communication with the air inlet hole. The fan is arranged on the one side of the light engine. The fan is provided with a first air outlet, a first air inlet facing the bottom wall of the housing, and a second air inlet facing a top wall of the housing. The first air inlet is in communication with the first gap, and the second air inlet is in communication with the second gap. The first air outlet is arranged to be opposite to the first radiator, and the fan is configured to drive cooling airflow entering the housing from the air inlet hole to respectively flow through the first gap and the second gap respectively and then flow towards the first radiator, and to be discharged from the air outlet hole.

In an embodiment, the bottom wall of the housing includes a planar portion and an inclined portion. The inclined portion is inclined from a periphery of the planar portion towards the top wall of the housing, and both the air inlet hole and the air outlet hole are arranged on the inclined portion.

In an embodiment, the inclined portion is provided with a plurality of strip-shaped holes. The plurality of strip-shaped holes extend from a side of the inclined portion connected to the planar portion to another side of the inclined portion away from the planar portion. The plurality of strip-shaped holes are arranged at intervals in a circumferential direction of the inclined portion. The strip-shaped hole facing the light engine is the air inlet hole, and the strip-shaped hole facing the first radiator is the air outlet hole.

In an embodiment, the first radiator includes an air inlet end and an air outlet end. The first radiator includes a plurality of first radiating fins arranged at intervals. The plurality of first radiating fins are arranged in a fan shape between the air inlet end and the air outlet end. A first airflow channel is formed between two adjacent first radiating fins. The first airflow channel includes a third air inlet positioned at the air inlet end and a second air outlet positioned at the air outlet end. The second air outlet faces and is in communication with the air outlet hole. The third air inlet faces and is in communication with the first air outlet.

In an embodiment, each of the first radiating fins include a first side surface and a second side surface that are arranged opposite each other. Two sides of the first side surface are respectively connected to the air inlet end and a side of the air outlet end away from the air inlet end, two sides of the second side surface are respectively connected to the air inlet end and another side of the air outlet end adjacent to the air inlet end. Flanges are arranged at edges of the first side surface and the second side surface, so that the first airflow channel is formed between the two adjacent first radiating fins. The projection device further includes a sealing layer. The sealing layer is arranged on the first side surface and in sealing connection with the first side surface.

In an embodiment, the projection device further includes a first sealing member. A periphery of the air outlet end is in sealing connection with the bottom wall of the housing through the first sealing member.

In an embodiment, the housing includes a first sidewall, a second sidewall, a third sidewall, and a fourth sidewall that extend from the top wall to the bottom wall. The first sidewall and the second sidewall face each other. The third sidewall and the fourth sidewall face each other and are arranged between the first sidewall and the second sidewall. Two sides of the third sidewall and two sides of the fourth sidewall are connected to the first sidewall and the second sidewall respectively. The light engine is arranged adjacent to the first sidewall, the fan is arranged between the light engine and the second sidewall. An end of the fan provided with the first air outlet faces a connection portion between the second sidewall and the third sidewall. A preset angle θ is formed between a normal line of a plane where the first air outlet is positioned and the third sidewall, where $35°≤θ≤55°$.

In an embodiment, the first radiator further includes a flow equalizer. The flow equalizer is provided with a first air port, a second air port, and a flow equalizing channel connecting the first air port and the second air port. An end of the flow equalizer provided with the first air port is in sealing connection with the air inlet end of the first radiator, the first air port is in communication with the third air inlet. Another end of the flow equalizer provided with the second air port is in sealing connection with an end of the fan provided with the first air outlet, and the second air port is in communication with the first air outlet.

In an embodiment, the projection device further includes a heat insulating layer. The heat insulating layer is in sealing connection with a side of the first radiator facing the circuit board.

In an embodiment, a projection lens is connected to a front side of the light engine. A light modulator is arranged in the light engine. A second radiator is arranged on a side of the light engine facing away from the projection lens. The second radiator is connected to the light modulator in a thermal conductive manner. The second radiator faces the air inlet hole, and the fan is further configured to drive the cooling airflow entering the housing from the air inlet hole to flow through the second radiator.

In an embodiment, the projection device further includes a sound box. The sound box is arranged in the housing and positioned on a side of the second radiator away from the light engine. A first sound outlet hole is arranged on a side of the housing, and a first loudspeaker is arranged on a side of the sound box, the first loudspeaker faces the first sound outlet hole. Or, a first sound outlet hole and a second sound outlet hole are arranged on two opposite sides of the housing respectively, a first loudspeaker and a second loudspeaker are arranged on two opposite sides of the sound box respectively, the first loudspeaker faces the first sound outlet hole, the second loudspeaker faces the second sound outlet hole. A noise reduction hole is arranged on the bottom wall of the housing. The noise reduction hole faces the sound box.

In an embodiment, a first blocking portion and a second blocking portion are arranged on an inner side of the housing. The first blocking portion is arranged on the bottom wall of the housing, the sound box is arranged between the first blocking portion and the top wall of the housing. A side of the sound box adjacent to the light engine abuts against the second blocking portion, to partition an internal space of the housing into a heat-dissipation cavity and a sound-box cavity that are independent of each other. The sound box is arranged in the sound-box cavity, the light engine and the fan are arranged in the heat-dissipation cavity. A noise reduction hole is further arranged on the bottom wall of the housing. The noise reduction hole is in communication with the sound-box cavity, and both the air inlet hole and the air outlet hole are in communication with the heat-dissipation cavity. A first blocking member is arranged between the sound box and the first blocking portion. The first blocking member abuts against the first blocking portion and the sound box respectively. A second blocking member is arranged between the sound box and the second blocking portion. The second blocking member abuts against the second blocking portion and the sound box respectively.

In an embodiment, an electronic element is arranged on a side of the circuit board facing the light engine, and the projection device further includes a third radiator. The third radiator is arranged in the second gap and connected to the electronic element in a thermal conductive manner.

In an embodiment, the projection device further includes a temperate equalization layer. The temperate equalization layer covers an inner side of the top wall of the housing.

According to the above projection device, during the projection, the light source may generate heat and transfer the heat to the first radiator. The fan is rotated to cause negative pressure to be generated, so that the air enters the housing through the air inlet hole, and the air forms cooling airflow under the action of the fan. The cooling airflow flows through the first gap and the second gap respectively, correspondingly taking away heat from the bottom side of the light engine, the top side of the light engine, and the circuit board. Then, the cooling airflow subjected to heat exchange with the light engine flows out of the first gap and the second gap and flows towards the first radiator to take away the heat of the first radiator to realize heat dissipation of the light source. Finally, the cooling airflow subjected to heat exchange with the first radiator is discharged from the air outlet hole. In this way, the cooling airflow entering the housing can simultaneously flow through the first gap between the bottom side of the light engine and the housing and the second gap between the top side of the light engine and the circuit board, which can improve heat dissipation efficiency of the light engine, reduce a temperature of the light engine, and ensure optical performance of optical devices in the light engine. Since the light engine faces the air inlet hole, projection brightness of the projection device can be ensured, and a service life of the projection device can be prolonged. In addition, both the air inlet hole and the air outlet hole are arranged on the bottom wall of the housing, so that, after the projection device is placed on a table top, a user may not see the air inlet hole and the air outlet hole on the bottom wall of the housing, which realizes concealment of the air inlet hole and the air outlet hole and ensures consistency of the appearance of the housing. In addition, when the user approaches the projection device, the airflow flowing out from the air outlet hole may not flow directly towards the user, which can improve user experience.

BRIEF DESCRIPTION OF THE DRAWINGS

The accompanying drawings composed of a part of the present disclosure are used to provide further understanding of the present disclosure, and exemplary embodiments of the present disclosure and the description thereof are intended to explain the present disclosure but do not constitute improper limitations on the present disclosure.

In order to more clearly illustrate the technical solutions in embodiments of the present disclosure, the accompanying drawings to be used in the description of the embodiments will be briefly introduced below. It is apparent that, the accompanying drawings in the following description are only some embodiments of the present disclosure, and other drawings can be obtained by those of ordinary skill in the art from the drawings without creative efforts.

Figure 1:
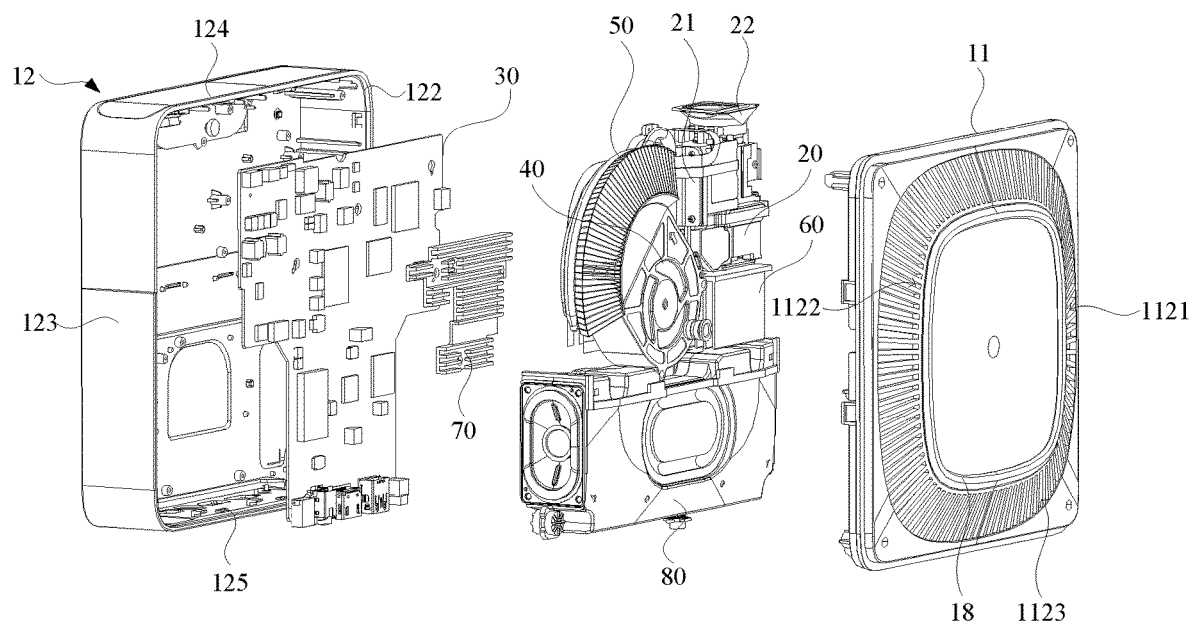
FIG. 1 is an exploded view of a projection device according to an embodiment of the present disclosure.

Illustration for reference signs: 10: housing; 11: bottom wall; 111: planar portion; 112: inclined portion; 1121: air inlet hole; 1122: air outlet hole; 1123: strip-shaped hole; 1124: communication hole; 12: top housing; 121: temperate equalization layer; 122: first sidewall; 123: second sidewall; 124: third sidewall; 125: fourth sidewall; 13: first gap; 14: second gap; 15: heat-dissipation cavity; 16: sound-box cavity; 17: blocking member; 171: first blocking member; 18: bottom pad; 19: blocking portion; 191: first blocking portion; 1911: first blocking rib; 192: second blocking portion; 1921: second blocking rib; 1922: third blocking rib; 20: light engine; 21: light source; 22: projection lens; 30: circuit board; 40: fan; 41: first air outlet; 42: first air inlet; 43: second air inlet; 50: first radiator; 51: air outlet end; 511:

second air outlet; 52: air inlet end; 521: third air inlet; 53: first radiating fin; 54: heat insulating layer; 55: sealing layer; 56: flow equalizer; 561: first air port; 562: second air port; 563: flow equalizing channel; 57: heat-conducting tube; 58: second side surface; 59: first side surface; 60: second radiator; 61: second radiating fin; 70: third radiator; 80: sound box.

DETAILED DESCRIPTION OF THE EMBODIMENTS

In order to make the above objects, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by specific embodiments disclosed below.

Referring to FIGS. 1 to 4, a projection device according to an embodiment of the present disclosure includes a housing 10, and a light engine 20, a circuit board 30, and a fan 40 that are arranged in the housing 10. A bottom wall 11 of the housing 10 is provided with an air inlet hole 1121 and an air outlet hole 1122. The light engine 20 faces the air inlet hole 1121. A first gap 13 is formed between a bottom side of the light engine 20 and the bottom wall 11 of the housing 10. The first gap 13 is in communication with the air inlet hole 1121. The circuit board 30 is arranged on a top side of the light engine 20. A second gap 14 is formed between the circuit board 30 and the light engine 20. The second gap 14 is in communication with the air inlet hole 1121. A light source 21 is connected to one side of the light engine 20. A first radiator 50 is arranged on a side of the light source 21 away from the light engine. The first radiator 50 is connected to the light source 21 in a thermal conductive manner. The fan 40 is arranged on the one side of the light engine 20. The fan 40 is provided with a first air outlet 41, a first air inlet 42 facing the bottom wall 11 of the housing 10, and a second air inlet 43 facing a top wall of the housing 10. The first air inlet 42 is in communication with the first gap 13. The second air inlet 43 is in communication with the second gap 14. The first air outlet 41 and the first radiator 50 are correspondingly arranged. The fan 40 is configured to drive cooling airflow entering the housing 10 from the air inlet hole 1121 to respectively flow through the first gap 13 and the second gap 14 and then flow towards the first radiator 50, and to be discharged from the air outlet hole 1122.

It should be noted that, referring to FIG. 1, the housing 10 includes a top housing 12 and the bottom wall 11. The bottom wall 11 and the top housing 12 enclose a receiving cavity. The light engine 20, the circuit board 30, and the fan 40 are arranged in the receiving cavity. The top wall refers to one side of the top housing 12 opposite to the bottom wall 11.

According to the above projection device, during the projection, the light source 21 may generate heat and transfer the heat to the first radiator 50. The fan 40 is rotated to cause negative pressure to be generated, so that the air enters the housing 10 through the air inlet hole 1121, and the air forms the cooling airflow under the action of the fan 40. The cooling airflow flows through the first gap 13 and the second gap 14 respectively, correspondingly taking away heat from the bottom side of the light engine 20, the top side of the light engine 20, and the circuit board 30. Then, the cooling airflow subjected to heat exchange with the light engine 20 flows out of the first gap 13 and the second gap 14 and flows towards the first radiator 50 to take away the heat of the first radiator 50 to realize heat dissipation of the light source 21. Finally, the cooling airflow subjected to heat exchange with the first radiator 50 is discharged from the air outlet hole 1122. In this way, the cooling airflow entering the housing 10 can simultaneously flow through the first gap 13 between the bottom side of the light engine 20 and the housing 10 and the second gap 14 between the top side of the light engine 20 and the circuit board 30, which can improve heat dissipation efficiency of the light engine 20, reduce a temperature of the light engine 20, and ensure optical performance of optical devices in the light engine 20. Since the light engine 20 faces the air inlet hole 1121, projection brightness of the projection device can be ensured, and a service life of the projection device can be prolonged. In addition, both the air inlet hole 1121 and the air outlet hole 1122 are arranged on the bottom wall 11 of the housing 10, so that, after the projection device is placed on a table top, a user may not see the air inlet hole 1121 and the air outlet hole 1122 on the bottom wall of the housing 10, which realizes concealment of the air inlet hole 1121 and the air outlet hole 1122 and ensures consistency of the appearance of the housing 10. In addition, when the user approaches the projection device, the airflow flowing out from the air outlet hole 1122 may not flow directly towards the user, which can improve user experience.

Figures 4, 5:
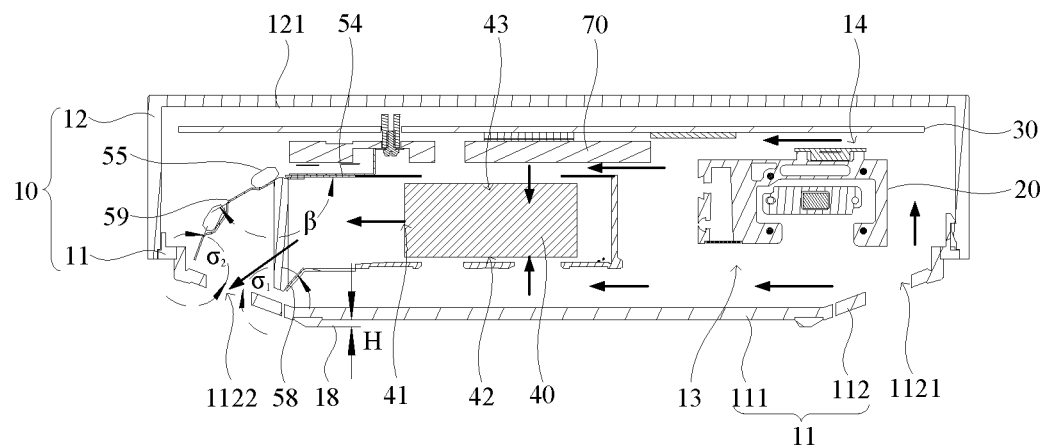
FIG. 4 is a transverse cross-sectional view of the projection device shown in FIG. 3.
FIG. 5 is a schematic view of a fan and a first radiator of the projection device shown in FIG. 1.
Figure 7:
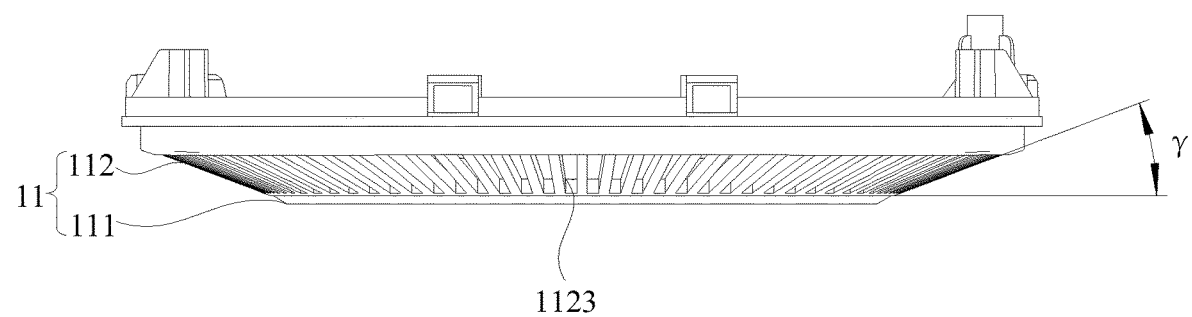
FIG. 7 is a schematic view of a bottom wall of the projection device shown in FIG. 1.

In an embodiment, referring to FIGS. 4 and 7, the bottom wall 11 of the housing 10 includes a planar portion 111 and an inclined portion 112. The inclined portion 112 is inclined from a periphery of the planar portion 111 towards the top wall of the housing 10. Both the air inlet hole 1121 and the air outlet hole 1122 are arranged on the inclined portion 112. During the projection, the projection device is placed on the table top, and the inclined portion 112 is spaced apart from the table top to prevent blockage of the air inlet hole 1121 and the air outlet hole 1122 by the table top, which can ensure smoothness of introducing the air and discharging the air. In addition, a height of the projection device can also be controlled.

In this embodiment, the inclined portion 112 is inclined outwardly from the periphery of the planar portion 111 towards the top wall of the housing 10. It may be understood that "inclined outwardly" means that a distance between opposite sides of the inclined portion 112 gradually increases from the planar portion 111 towards the top wall of the housing 10. Optionally, referring to FIG. 7, an angle γ is formed between the inclined portion 112 and the planar portion 111, where $20°≤γ≤30°$.

Optionally, referring to FIGS. 1 and 7, the inclined portion 112 is provided with a plurality of strip-shaped holes 1123. The plurality of strip-shaped holes 1123 extend from a side of the inclined portion 112 connected to the planar portion 111 to another side of the inclined portion 112 away from the planar portion 111. The plurality of strip-shaped holes 1123 are arranged at intervals in a circumferential direction of the inclined portion 112. The strip-shaped hole 1123 facing the light engine 20 is the air inlet hole 1121, and the strip-shaped hole 1123 facing the first radiator 50 is the air outlet hole 1122. Certainly, in other embodiments, both the air inlet hole 1121 and the air outlet hole 1122 may alternatively be holes in other shapes. For example, the air inlet hole 1121 and the air outlet hole 1122 are round holes, square holes, or the like.

Further, referring to FIGS. 1 and 4, the planar portion 111 is provided with a bottom pad 18. Optionally, a height of the bottom pad 18 is H, where 2 mm≤H≤5 mm. In this way, the bottom pad 18 can support the projection device, increase distances between the air inlet hole 1121 and the air outlet hole 1122 and the table top, and reduce turbulent noise caused by an impact of the airflow flowing out of the air outlet hole 1122 on the table top.

Further, referring to FIG. 1, the bottom pad 18 has an annular structure, and the bottom pad 18 is arranged on the periphery of the planar portion 111 in a circumferential direction of the planar portion 111. It should be noted that the periphery of the planar portion 111 refers to a connection portion between the planar portion 111 and the inclined portion 112. In this way, the bottom pad 18 can isolate the air inlet hole 1121 from the air outlet hole 1122 to prevent backflow of hot airflow.

Figure 6:
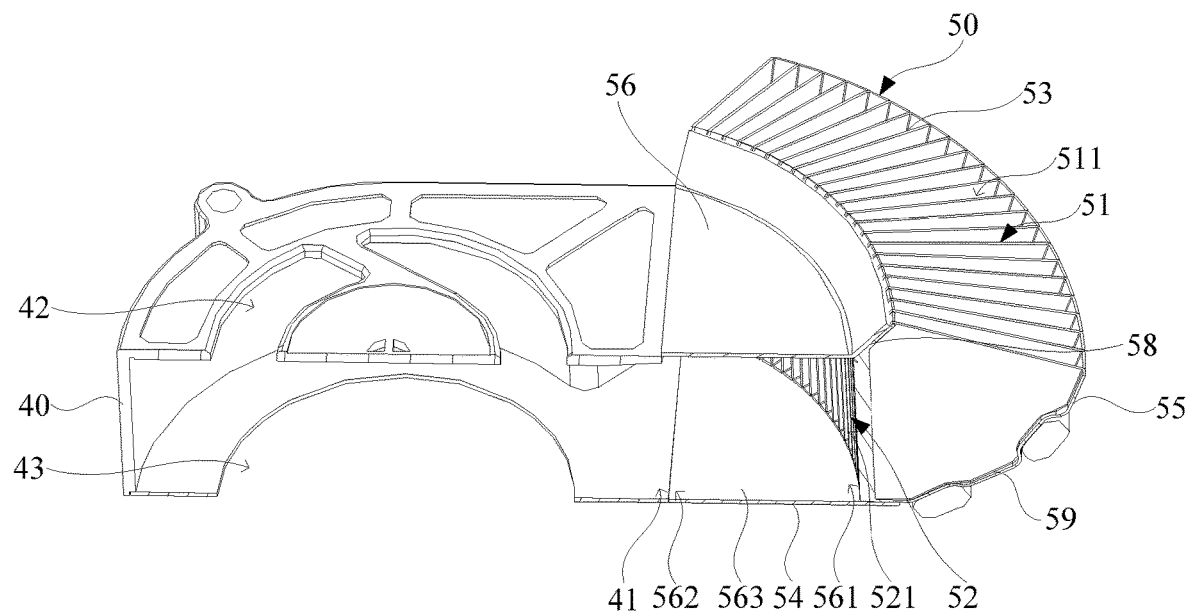
FIG. 6 is a cross-sectional view taken along A-A in FIG. 5.

In an embodiment, referring to FIGS. 1, 5, and 6, the first radiator 50 has an air inlet end 52 and an air outlet end 51. The first radiator 50 includes a plurality of first radiating fins 53 arranged at intervals. The plurality of first radiating fins 53 are arranged in a fan shape between the air inlet end 52 and the air outlet end 51. A first airflow channel is formed between two adjacent first radiating fins 53. The first airflow channel has a third air inlet 521 positioned at the air inlet end 52 and a second air outlet 511 positioned at the air outlet end 51. The second air outlet 511 faces and is in communication with the air outlet hole 1122, and the third air inlet 521 faces and is in communication with the first air outlet 41. During the projection, under the action of the fan 40, the cooling airflow flowing through the first gap 13 and the second gap 14 enters the first airflow channel from the third air inlet 521 and exchanges heat with the first radiating fin 53, and the cooling airflow subjected to heat exchange is discharged out of the housing 10 from the second air outlet 511 and the air outlet hole 1122, to realize heat dissipation of the light source 21.

Optionally, referring to FIG. 5, shapes and sizes of the plurality of first radiating fins 53 are the same. In this way, mold making costs can be controlled, and machining difficulty of the first radiator 50 can be reduced.

Optionally, the first radiator 50 further includes a heat-conducting tube 57. The heat-conducting tube 57 has one end connected to the first radiating fin 53 in a thermal conductive manner, and the other end connected to the light source 21 in a thermal conductive manner. Further, heat conducting substrate is connected to the said other end of the heat-conducting tube 57, and the heat-conducting substrate is connected to the light source 21 in a thermal conductive manner. During the projection, the heat generated by the light source 21 is transferred to the first radiator 50 through the heat-conducting tube 57. The fan 40 drives the cooling airflow entering the housing 10 from the air inlet hole 1121 to respectively flow through the first gap 13 and the second gap 14 and then flow towards the first radiator 50, such that the cooling airflow takes away the heat on the first radiator 50, thereby realizing the heat dissipation of the light source 21. Further, an obtuse angle is formed between an air introducing direction and an air discharging direction of the first airflow channel. In this way, an air discharging direction of the cooling airflow can be changed, and discharging smoothness of the cooling airflow can be ensured.

In an embodiment, referring to FIGS. 5 and 6, the first radiating fin 53 includes a first side surface 59 and a second side surface 58 that are arranged opposite to each other. Specifically, two sides of the first side surface 59 are respectively connected to the air inlet end 52 and one side of the air outlet end 51 away from the air inlet end 52, and two sides of the second side surface 58 are respectively connected to the air inlet end 52 and another side of the air outlet end 51 adjacent to the air inlet end 52. Flanges are arranged at edges of the first side surface 59 and the second side surface 58, so that the first airflow channel is formed between the two adjacent first radiating fins 53. In this way, two adjacent first radiating fins 53 enclose the first airflow channel. A length of the first side surface 59 is greater than that of the second side surface 58, and the first side surface 59 bends towards the bottom wall 11 of the housing 10, so that the obtuse angle is formed between the air introducing direction and the air discharging direction of the first airflow channel.

Optionally, a width of the second air outlet 511 gradually increases from the second side surface 58 to the first side surface 59. In this way, the cooling airflow is more dispersed in the first airflow channel to take away more heat from the first radiator 50 and improve a heat-dissipation effect of the first radiator 50. Referring to FIGS. 5 and 6, since the flanges are arranged at the edges of the first side surface 59 and the second side surface 58, and two adjacent first radiating fins 53 and the flanges enclose the first airflow channel, there may be a small gap between the two adjacent first radiating fins 53, such that heat leakage may occur in the first air outlet 41 of the fan 40 as a high-speed airflow region, resulting in backflow of the airflow and reducing the new air introducing volume of the third air inlet 521. Therefore, in this embodiment, the projection device further includes a sealing layer 55. The sealing layer 55 is arranged on the first side surface 59 and is in sealing connection with the first side surface 59. In this way, air leakage from the first radiator 50 can be prevented, an air volume entering the first airflow channel can be ensured, and heat dissipation efficiency can be improved.

Optionally, the sealing layer 55 is an adhesive sealing layer. The adhesive sealing layer is adhered to the first side surface 59.

In an embodiment, referring to FIG. 6, an area of the second air outlet 511 is greater than that of the third air inlet 521. In this way, a flow velocity of the cooling airflow at the second air outlet 511 can be reduced, generated wind sound can be reduced, and noise can be lowered. Referring to FIGS. 4 and 6, for the fan-shaped first radiator 50, since the width of the second air outlet 511 gradually increases in a direction from the air inlet end 52 to the air outlet end 51, the cooling airflow is less affected by a reverse pressure gradient during flowing in the first airflow channel, which can ensure smooth flowing of the cooling airflow and improve heat dissipation performance. Referring to FIG. 4, an angle formed between the second side surface 58 and the inclined portion 112 is Gi, where $110°≤\sigma_1≤140°$. An angle formed between one end of the first side surface 59 connected to the air outlet end 51 and the inclined portion 112 is $\sigma_2$, where $90°≤\sigma_2≤120°$. In this way, the heat dissipation performance of the first radiator 50 can be enhanced, turbulent noise of the air outlet hole 1122 can be lowered, and the height of the projection device can be reduced.

Figure 2:
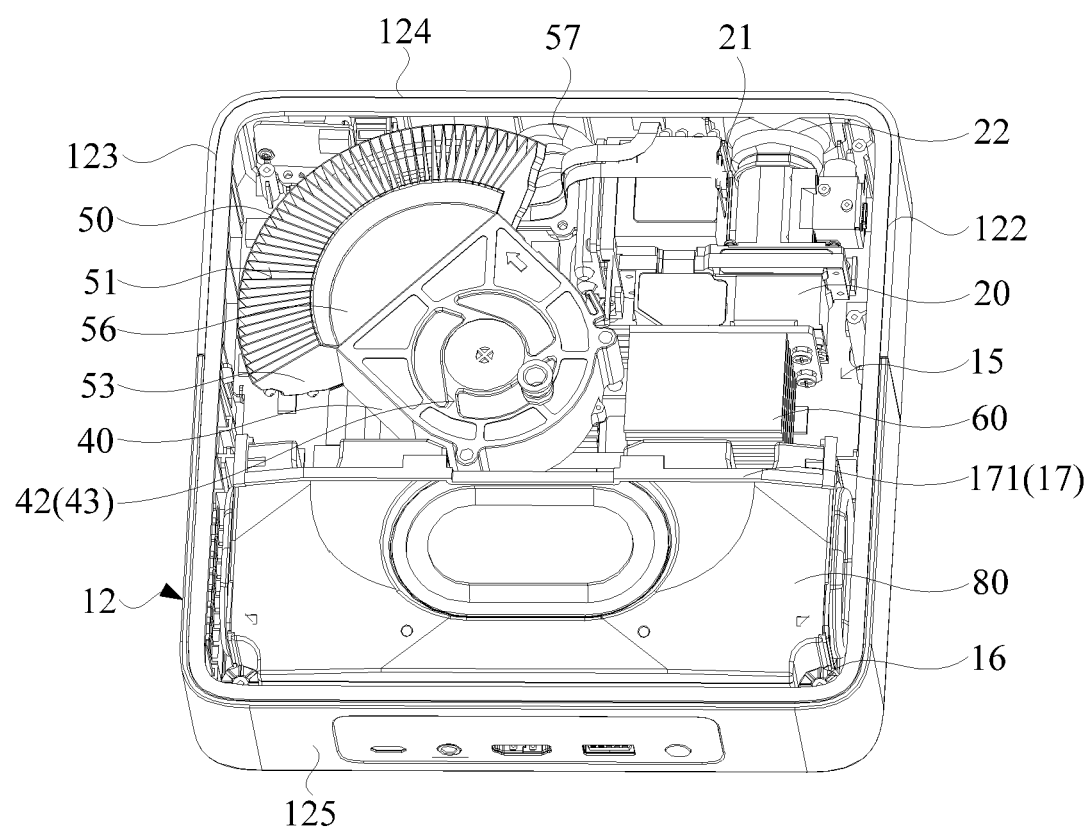
FIG. 2 is a schematic view of an internal structure of the projection device shown in FIG. 1.

In an embodiment, referring to FIGS. 1 and 2, the projection device further includes a first sealing member. A periphery of the air outlet end 51 is in sealing connection with the bottom wall 11 of the housing 10 through the first sealing member. Optionally, the first sealing member is foam. In this way, an outlet wall of the second air outlet 511 is in sealing connection with the bottom wall 11 of the housing 10, which can prevent backflow of hot air and ensure the heat dissipation effect.

In an embodiment, referring to FIG. 5, the first radiator 50 has a sector angle of α, where 125°≤α≤150°. Through reasonable setting of the sector angle of the first radiator 50, low heat dissipation efficiency, which is caused by impossibility of fully utilizing the cooling airflow flowing out from the fan 40 due to an excessively small sector angle of the first radiator 50, can be prevented, and increases in volume and cost caused by ineffective arrangements of part of the first radiating fins 53 due to that the cooling airflow flowing out from the fan 40 cannot flow through each of the first radiating fins 53, which is caused by an excessively large sector angle of the first radiator 50, can also be prevented.

In an embodiment, referring to FIGS. 5 and 6, the first radiator 50 further includes a flow equalizer 56. The flow equalizer 56 is provided with a first air port 561, a second air port 562, a flow equalizing channel 563 connecting the first air port 561 and the second air port 562. The first air port 561 is in communication with the third air inlet 521, and the second air port 562 is in communication with the first air outlet 41. During the projection, the cooling airflow flows out of the first air outlet 41 under the action of the fan 40, flows through the flow equalizing channel 563, and then flows into the first airflow channel of the first radiator 50. In this way, through the arrangement of the flow equalizer 56, the flow equalizer 56 can effectively equalize the cooling airflow flowing out from the first air outlet 41 of the fan 40, improve uniformity of the cooling airflow entering the first airflow channel, and enhance the heat dissipation performance of the first radiator 50.

Further, referring to FIGS. 5 and 6, an end of the flow equalizer 56 provided with the first air port 561 is in sealing connection with the air inlet end 52 of the first radiator 50, and another end of the flow equalizer 56 provided with the second air port 562 is in sealing connection with an end of the fan 40 provided with the first air outlet 41. In this way, ends of the flow equalizer 56 provided with the first air port 561 and the second air port 562 are in sealing connection to the first radiator 50 and the fan 40 respectively, which can prevent an influence of air leakage of the flow equalizer 56 on a volume of the cooling airflow.

Optionally, the sealing connection includes, but is not limited to, tape sealing, tight abutment sealing, sealing-strip sealing, or the like.

Further, referring to FIGS. 4 and 6, the projection device further includes a heat insulating layer 54. The heat insulating layer 54 is in sealing connection with a side of the first radiator 50 facing the circuit board 30. Specifically, the heat insulating layer 54 is arranged on a side of the first radiating fin 53 and/or the flow equalizer 56 facing the circuit board 30. In this way, the heat insulating layer 54 can play a role in blocking the hot airflow, preventing the hot airflow from rising towards the circuit board 30 to contact with the circuit board 30 to cause the circuit board 30 to overheat.

Optionally, the heat insulating layer 54 is a heat-insulating adhesive layer. The heat-insulating adhesive layer is adhered to a side of the first radiator 50 facing the circuit board 30 to realize the sealing connection between the heat-insulating adhesive layer and the side of the first radiator 50 facing the circuit board 30.

Figure 3:
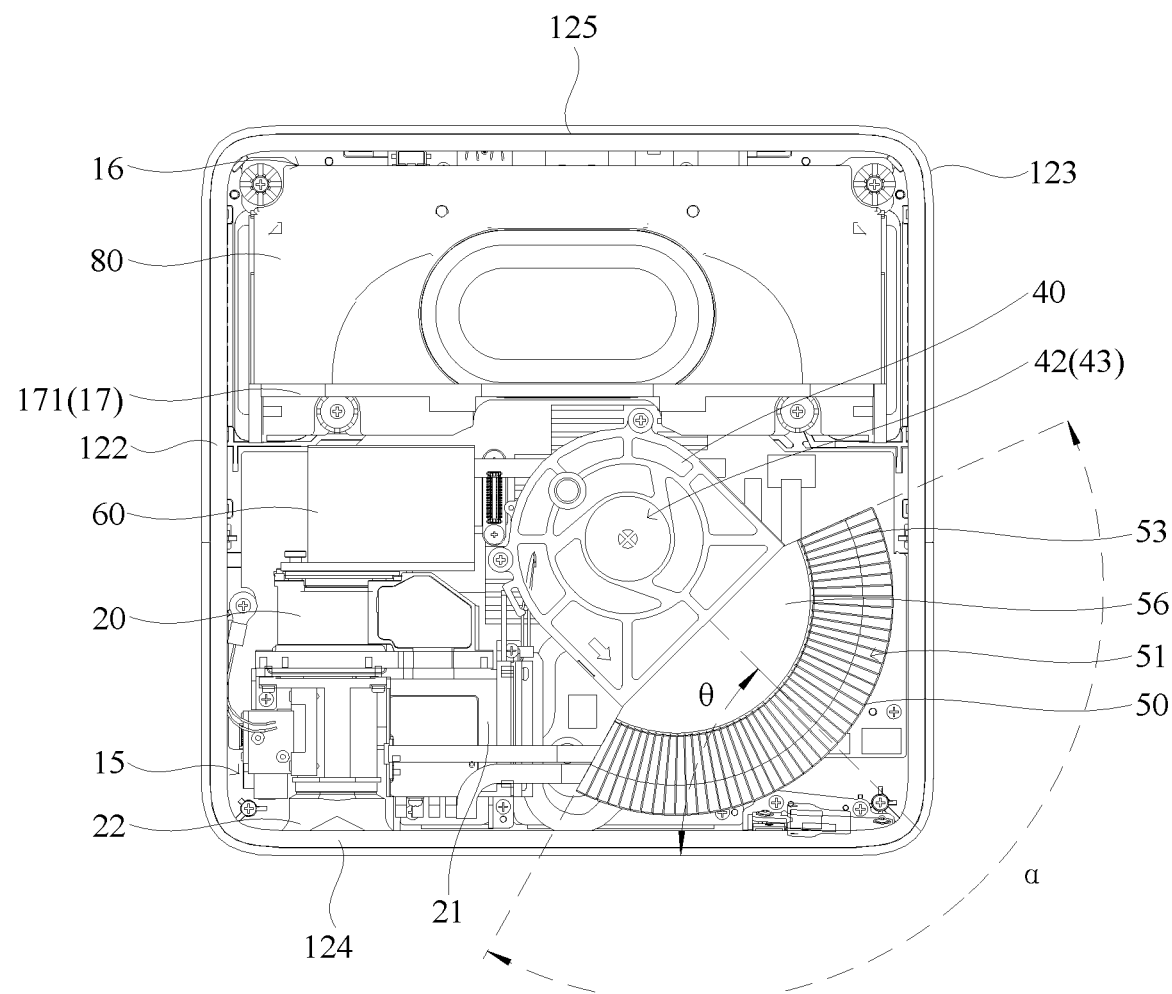
FIG. 3 is a top view of the projection device shown in FIG. 2.

In an embodiment, referring to FIG. 3, the housing 10 includes a first sidewall 122, a second sidewall 123, a third sidewall 124, and a fourth sidewall 125 that extend from the top wall to the bottom wall 11. The first sidewall 122 the second sidewall 123 face each other. The third sidewall 124 and the fourth sidewall 125 face each other, and are arranged between the first sidewall 122 and the second sidewall 123. Two sides of the third sidewall 124 and two sides of the fourth sidewall 125 are connected to the first sidewall 122 and the second sidewall 123 respectively. The light engine 20 is arranged adjacent to the first sidewall 122. The fan 40 is arranged between the light engine 20 and the second sidewall 123. The end of the fan 40 provided with the first air outlet 41 faces a connection portion between the second sidewall 123 and the third sidewall 124. A preset angle θ is formed between a normal line of a plane where the first air outlet 41 is positioned and the third sidewall 124, where 35°≤θ≤55°. In this way, the fan 40 is arranged obliquely, and the fan-shaped first radiator 50 is arranged among the fan 40, the first sidewall 122, and the second sidewall 123, which can reduce dimensions of the housing 10 in horizontal and vertical directions, increase an area of the first radiator 50 in the same space, and improve heat dissipation efficiency, and can also make full use of an internal space of the housing 10 and reduce a volume of the projection device. Through the above configuration, the fan-shaped first radiator 50 can be entirely arranged in the corner of the housing 10, so that the dimension of the housing 10 in the vertical direction can be reduced, which can prevent the fan-shaped first radiator 50 from affecting the installations of the components of the projection device positioning in the middle of the housing 10. In addition, the first air inlet 42 and the second air inlet 43 of the fan 40 are as close as possible to the light engine 20 relative to the first air outlet 41, so that the cooling airflow is introduced into the first air inlet 42 and the second air inlet 43 of the fan 40 through a shorter flow path, which can reduce resistance of the cooling airflow.

In an embodiment, referring to FIGS. 2 and 3, a projection lens 22 is connected to a front side of the light engine 20. It should be noted that the front side of the light engine 20 refers to a side of the light engine 20 facing the third sidewall 124. Specifically, the projection lens 22 and the light source 21 are arranged side by side, and both are positioned on the same side of the light engine 20. A light modulator is arranged in the light engine 20. A second radiator 60 is arranged on a side of the light engine 20 facing away from the projection lens 22. The second radiator 60 is connected to the light modulator in a thermal conductive manner. The second radiator 60 faces the air inlet hole 1121. The fan 40 is further configured to drive the cooling airflow entering the housing 10 from the air inlet hole 1121 to flow through the second radiator 60. During the projection, the light modulator may also generate heat and transfer the heat to the second radiator 60. The fan 40 is rotated to cause negative pressure to be generated, so that the air enters the housing 10 through the air inlet hole 1121, and the air forms cooling airflow under the action of the fan 40. The cooling airflow takes away heat from a surface of the second radiator 60 to realize heat dissipation of the light modulator.

Specifically, the second radiator 60 includes a plurality of second radiating fins 61 arranged at intervals. The plurality of second radiating fins 61 are arranged at intervals in a direction from the top wall to the bottom wall 11 of the housing 10, and a second airflow channel is formed between two adjacent second radiating fins 61.

In an embodiment, referring to FIGS. 2 and 3, the projection device further includes a sound box 80. The sound box 80 is arranged in the housing 10, and is positioned on a side of the second radiator 60 away from the light engine 20. In this way, the projection device can play sound. In addition, the sound box 80 is arranged on the side of the second radiator 60 away from the light engine 20, such that the internal space of the housing 10 can be rationally used, and the configuration of the projection device is compact.

Further, the sound box 80 includes at least one loudspeaker, and a sidewall of the housing 10 is provided with a sound outlet hole opposite to the loudspeaker. For example, a loudspeaker is arranged on a side of the sound box 80, a sidewall of the housing 10 is provided with a sound outlet hole, and the sound outlet hole faces the loudspeaker. Alternatively, a loudspeaker is arranged on each of two opposite sides of the sound box 80, a sound outlet hole is arranged on each of two opposite sidewalls of the housing 10, and the two sound outlet holes faces the two loudspeakers respectively. In this way, during the projection, sound from the loudspeaker can pass through the sound outlet hole to the outside of the housing 10 to realize playback of the sound. Further, decorative cloth layers are attached to outer surfaces of the top wall and the sidewall of the housing 10 respectively, through a wrapping process. The decorative cloth layer covers the sound outlet hole, which can realize concealment of the sound outlet hole, make the appearance of the housing 10 beautiful, and ensure playback of the sound.

Figure 8:
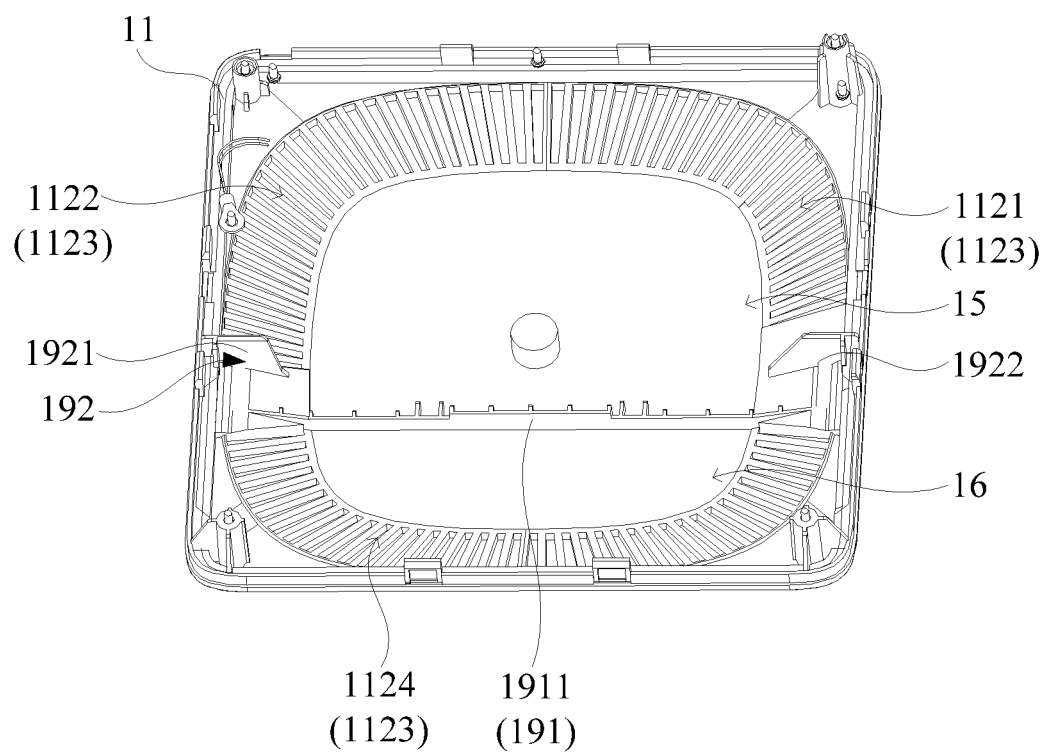
FIG. 8 is a schematic view of the bottom wall of the projection device shown in FIG. 5 from another perspective.

Further, referring to FIGS. 3 and 8, the projection device further includes a blocking member 17, and a blocking portion 19 is arranged on an inner side of the housing 10. The blocking member 17 is arranged between the blocking portion 19 and the sound box 80 and abuts against the blocking portion 19 and the sound box 80 respectively, to partition the internal space of the housing 10 into a heat-dissipation cavity 15 and a sound-box cavity 16 that are independent of each other. The sound box 80 further includes a passive radiator. The loudspeaker and the passive radiator are arranged in the sound-box cavity 16. The light engine 20 and the fan 40 are arranged in the heat-dissipation cavity 15. The bottom wall 11 of the housing 10 is further provided with a communication hole 1124. The communication hole 1124 is in communication with the sound-box cavity 16, and both the air inlet hole 1121 and the air outlet hole 1122 are in communication with the heat-dissipation cavity 15. During the projection, the passive radiator of the sound box 80 vibrates to drive the air to flow, and specifically, drive the airflow at a higher vibrating speed. The communication hole 1124 in communication with the sound-box cavity 16 is arranged on the bottom wall 11 of the housing 10, and the communication hole 1124 disperses the airflow, which prevents driving noise and improves a bass effect. The blocking portion 19, the blocking member 17, and the sound box 80 cooperate to partition the internal space of the housing 10 into the heat-dissipation cavity 15 and the sound-box cavity 16 that are independent of each other, both the air inlet hole 1121 and the air outlet hole 1122 are in communication with the heat-dissipation cavity 15, and the communication hole 1124 is in communication with the sound-box cavity 16, so that the communication hole 1124 may not affect the cooling airflow flowing into and out of the heat-dissipation cavity 15, so as to ensure that heat dissipation performance and acoustic performance of the projection device do not interfere with each other.

Optionally, the blocking member 17 is blocking foam. Certainly, in other embodiments, the blocking member can alternatively be made of other blocking materials, which is not limited thereto.

Specifically, the blocking portion 19 includes a first blocking portion 191 and a second blocking portion 192. The first blocking portion 191 is arranged on the bottom wall 11 of the housing 10. The sound box 80 is arranged between the first blocking portion 191 and the top wall of the housing 10. A side of the sound box 80 adjacent to the light engine 20 abuts against the second blocking portion 192, to partition the receiving cavity into the heat-dissipation cavity 15 and the sound-box cavity 16 that are independent of each other. The blocking member 17 includes a first blocking member 171 and a second blocking member. The first blocking member 171 is arranged between the sound box 80 and the first blocking portion 191, and abut against both the first blocking portion 191 and the sound box 80. The second blocking member is arranged between the sound box 80 and the second blocking portion 192, and abuts against both the second blocking portion 192 and the sound box 80. In this embodiment, the first blocking portion 191 includes a first blocking rib 1911. The first blocking rib 1911 extends from one side of the inclined portion 112 through the planar portion 111 to the other side of the inclined portion. The second blocking portion 192 includes a second blocking rib 1921, a third blocking rib 1922, a fourth blocking rib, and a fifth blocking rib. The second blocking rib 1921 and the third blocking rib 1922 are arranged on two opposite sides of the inclined portion 112 respectively and are connected to the first blocking rib 1911 respectively. The fourth blocking rib and the fifth blocking rib are correspondingly arranged on the top wall of the housing 10 respectively. The second blocking rib 1921 is connected to and cooperates with the fourth blocking rib, and the third blocking rib 1922 is connected to and cooperates with the fifth blocking rib.

In an embodiment, referring to FIGS. 1 and 4, electronic elements are arranged on a side of the circuit board 30 facing the light engine 20. The projection device further includes a third radiator 70. The third radiator 70 is arranged in the second gap 14 and connected to the electronic elements in a thermal conductive manner. During the projection, the fan 40 drives the cooling airflow entering the housing 10 from the air inlet hole 1121 to flow through the second gap 14 between the circuit board 30 and the top side of the light engine 20, such that the cooling airflow exchanges heat with the top side of the light engine 20, and then the cooling airflow subjected to heat exchange flows through the third radiator 70 to take away heat of the third radiator 70, thereby reducing temperatures of the electronic elements.

Further, the third radiator 70 is connected to the electronic elements on the circuit board 30 in a thermal conductive manner through a thermally conductive interfacial material. In this way, the thermally conductive interfacial material can fill a micro-gap and an uneven surface generated when the third radiator 70 is in contact with the electronic elements on the circuit board 30, which reduces thermal resistance and improves heat dissipation performance of the electronic elements.

Referring to FIG. 4, since the first radiator 50 dissipates heat of the light source 21, a temperature of a surface of the first radiator 50 is relatively high, which may heat the electronic elements on the circuit board 30. For the electronic elements arranged on the circuit board 30 that are capable of generating a large amount of heat, a gap between the circuit board 30 and the top wall of the housing 10 is small, and thus the heat is accumulated in the small space to heat the housing 10. Due to low thermal conductivity of the plastic housing 10, local hot spots may be generated on the top wall of the housing 10, affecting user experience. Therefore, in this embodiment, the projection device further includes a temperate equalization layer 121. The temperate equalization layer 121 covers an inner side of the top wall of the housing 10. In this way, the temperate equalization layer 121 is attached to an inner side of the top wall of the housing 10, which is beneficial to reduce temperatures of the local hot spots on the top wall of the housing 10 and improve user experience.

Optionally, the temperate equalization layer 121 is made of copper foil, aluminum foil, artificial graphene, or the like. Certainly, in other embodiments, the temperate equalization layer 121 can alternatively be layers made of other materials, which is not limited thereto.

The projection device according to the present disclosure can ensure a heat dissipation effect and projection brightness.

In the description of the present disclosure, it should be understood that the orientation or position relationships indicated by terms "central", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", etc. are based on the orientation or position relationships shown in the accompanying drawings and are only intended to facilitate the description of the present disclosure and simplify the description, rather than indicating or implying that the indicated apparatus or element must have a particular orientation or be constructed and operated in a particular orientation, and therefore are not to be interpreted as limiting the present disclosure.

In addition, terms "first" and "second" are used for descriptive purposes only, which cannot be construed as indicating or implying a relative importance or implicitly specifying the number of the indicated technical features. Thus, the features defined with "first" and "second" may explicitly or implicitly include at least one feature. In the description of the present disclosure, "a plurality of" means at least two, such as two or three, unless specifically stated otherwise.

In the present disclosure, unless otherwise specifically stated and limited, terms "mounting", "coupling", "connecting", "fixing" or the like should be understood in a broad sense. For example, the term "connecting" may be a fixed connection, or a detachable connection, or an integral connection; or may be a mechanical connection, or an electrical connection; or may be a direct connection, or an indirect connection through an intermediate medium, or internal communication between two elements, or an interaction of two elements, unless otherwise expressly defined. For those of ordinary skill in the art, the specific meanings of the foregoing terms in the present disclosure can be understood on a case-by-case basis.

In the present disclosure, unless otherwise explicitly specified and defined, a first feature being "on" or "under" a second feature may be a case that the first feature is in direct contact with the second feature, or the first feature is in indirect contact with the second feature via an intermediate medium. Furthermore, the first feature being "over", "above", and "on top of" the second feature may be a case that the first feature is directly above or obliquely above the second feature, or only means that the level of the first feature is higher than that of the second feature. The first feature being "below", "underneath", and "under" the second feature may be a case that the first feature is directly underneath or obliquely underneath the second feature, or only means that the level of the first feature is lower than that of the second feature.

It should be noted that when one element is referred to as "fixed to" or "arranged on" another element, it may be directly disposed on the another element or an intermediate element may exist. When one element is considered to be "connected to" another element, it may be directly connected to the another element or an intermediate element may co-exist. The terms "vertical", "horizontal", "up", "down", "left", "right" and similar expressions used herein are for illustrative purposes only, and do not represent unique embodiments.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variants and improvements without departing from the conception of the present disclosure, and these all fall within the protection scope of the present disclosure. Therefore, the patent protection scope of the present disclosure should be subject to the appended claims.

What is claimed is:

1. A projection device, comprising:
   a housing; and
   a light engine, a circuit board, and a fan that are arranged in the housing;
   wherein a bottom wall of the housing is provided with an air inlet hole and an air outlet hole;
   wherein the light engine and the air inlet hole face each other; a first gap is formed between a bottom side of the light engine and the bottom wall of the housing, and is in communication with the air inlet hole; a light source is connected to one side of the light engine, a first radiator is arranged on a side of the light source, and the first radiator is connected to the light source in a thermal conductive manner;
   wherein the circuit board is arranged on a top side of the light engine, a second gap is formed between the circuit board and the light engine, and the second gap is in communication with the air inlet hole; and
   wherein the fan is arranged on the one side of the light engine, the fan is provided with a first air outlet, a first air inlet facing the bottom wall of the housing, and a second air inlet facing a top wall of the housing; and wherein the first air inlet is in communication with the first gap, and the second air inlet is in communication with the second gap; the first air outlet and the first radiator are correspondingly arranged, and the fan is configured to drive cooling airflow entering the housing from the air inlet hole to respectively flow through the first gap and the second gap respectively and then flow towards the first radiator, and to be discharged from the air outlet hole.

2. The projection device according to claim 1, wherein the bottom wall of the housing comprises a planar portion and an inclined portion, the inclined portion being inclined from a periphery of the planar portion towards the top wall of the housing, and both the air inlet hole and the air outlet hole are arranged on the inclined portion.

3. The projection device according to claim 2, wherein the inclined portion is provided with a plurality of strip-shaped holes, the plurality of strip-shaped holes extending from a side of the inclined portion connected to the planar portion to another side of the inclined portion away from the planar portion, the plurality of strip-shaped holes being arranged at intervals in a circumferential direction of the inclined portion; wherein the strip-shaped hole facing the light engine is the air inlet hole, and the strip-shaped hole facing the first radiator is the air outlet hole.

4. The projection device according to claim 1, wherein the first radiator comprises an air inlet end and an air outlet end, the first radiator comprises a plurality of first radiating fins arranged at intervals,
wherein the plurality of first radiating fins are arranged in a fan shape between the air inlet end and the air outlet end, and a first airflow channel is formed between two adjacent first radiating fins, and
wherein the first airflow channel comprises a third air inlet positioned at the air inlet end and a second air outlet positioned at the air outlet end, the second air outlet facing and being in communication with the air outlet hole, the third air inlet facing and being in communication with the first air outlet.

5. The projection device according to claim 4, wherein each of the first radiating fins comprise a first side surface and a second side surface that are arranged opposite to each other, and wherein two sides of the first side surface are respectively connected to the air inlet end and a side of the air outlet end away from the air inlet end, two sides of the second side surface are respectively connected to the air inlet end and another side of the air outlet end adjacent to the air inlet end, and flanges are arranged at edges of the first side surface and the second side surface, so that the first airflow channel is formed between the two adjacent first radiating fins; and
wherein the projection device further comprises a sealing layer arranged on the first side surface and in sealing connection with the first side surface.

6. The projection device according to claim 4, further comprising a first sealing member, and wherein a periphery of the air outlet end is in sealing connection with the bottom wall of the housing through the first sealing member.

7. The projection device according to claim 4, wherein the first radiator further comprises a flow equalizer provided with a first air port, a second air port, and a flow equalizing channel connecting the first air port and the second air port; and
wherein an end of the flow equalizer provided with the first air port is in sealing connection with the air inlet end, the first air port is in communication with the third air inlet, another end of the flow equalizer provided with the second air port is in sealing connection with an end of the fan provided with the first air outlet, and the second air port is in communication with the first air outlet.

8. The projection device according to claim 7, further comprising a heat insulating layer, the heat insulating layer being in sealing connection with a side of the first radiator facing the circuit board.

9. The projection device according to claim 1, wherein the housing comprises a first sidewall, a second sidewall, a third sidewall, and a fourth sidewall that extend from the top wall to the bottom wall, and wherein the first sidewall and the second sidewall face each other, the third sidewall and the fourth sidewall face each other and are arranged between the first sidewall and the second sidewall, and two sides of the third sidewall and two sides of the fourth sidewall are connected to the first sidewall and the second sidewall respectively; and
wherein the light engine is arranged adjacent to the first sidewall, the fan is arranged between the light engine and the second sidewall, an end of the fan provided with the first air outlet faces a connection portion between the second sidewall and the third sidewall, and a preset angle θ is formed between a normal line of a plane where the first air outlet is positioned and the third sidewall, where 35°≤θ≤55°.

10. The projection device according to claim 1, wherein a projection lens is connected to a front side of the light engine, a light modulator is arranged in the light engine, a second radiator is arranged on a side of the light engine facing away from the projection lens, the second radiator is connected to the light modulator in a thermal conductive manner, and the second radiator faces the air inlet hole, and the fan is further configured to drive the cooling airflow entering the housing from the air inlet hole to flow through the second radiator.

11. The projection device according to claim 10, further comprising a sound box arranged in the housing and positioned on a side of the second radiator away from the light engine; and
wherein the sound box comprises at least one loudspeaker, and a sound outlet hole facing the loudspeaker is arranged on a sidewall of the housing.

12. The projection device according to claim 11, further comprising a blocking member,
wherein a blocking portion is arranged on an inner side of the housing, the blocking member is arranged between the blocking portion and the sound box and abuts against the blocking portion and the sound box respectively to partition an internal space of the housing into a heat-dissipation cavity and a sound-box cavity that are independent of each other; and
wherein the sound box further comprises a passive radiator, the loudspeaker and the passive radiator are arranged in the sound-box cavity, the light engine and the fan are arranged in the heat-dissipation cavity, the bottom wall of the housing is further provided with a communication hole in communication with the sound-box cavity, and both the air inlet hole and the air outlet hole are in communication with the heat-dissipation cavity.

13. The projection device according to claim 1, wherein an electronic element is arranged on a side of the circuit board facing the light engine, and the projection device further comprises a third radiator arranged in the second gap and connected to the electronic element in a thermal conductive manner.

14. The projection device according to claim 1, further comprising a temperate equalization layer covering an inner side of the top wall of the housing.

\* \* \* \* \*